United States Patent
Kau

(10) Patent No.: US 7,090,170 B1
(45) Date of Patent: Aug. 15, 2006

(54) IN-ORBIT SATELLITE SENSOR ALIGNMENT DETERMINATION

(75) Inventor: Shing P. Kau, Seminole, FL (US)

(73) Assignee: Honeywell International, Inc., Morristown, NJ (US)

( * ) Notice: Subject to any disclaimer, the term of this patent is extended or adjusted under 35 U.S.C. 154(b) by 152 days.

(21) Appl. No.: 10/302,388

(22) Filed: Nov. 22, 2002

(51) Int. Cl.
B64G 1/36 (2006.01)

(52) U.S. Cl. ............................. 244/171; 244/164

(58) Field of Classification Search ............ 244/171, 244/158 R, 164; 250/203.4, 559.3; 701/13
See application file for complete search history.

(56) References Cited

U.S. PATENT DOCUMENTS

| | | | |
|---|---|---|---|
| 4,328,938 A * | 5/1982 | Reisman et al. | 244/171 |
| H192 H * | 1/1987 | Daehler | 250/203.4 |
| 4,786,018 A * | 11/1988 | Cope | 244/164 |
| 5,311,022 A * | 5/1994 | Savoca | 244/171 |
| 5,546,309 A * | 8/1996 | Johnson et al. | 244/171 |
| 5,556,058 A * | 9/1996 | Bender | 244/171 |
| 6,285,927 B1 * | 9/2001 | Li et al. | 701/13 |
| 6,289,268 B1 * | 9/2001 | Didinsky et al. | 244/171 |
| 6,471,161 B1 * | 10/2002 | D'Ambrosio et al. | 244/164 |
| 6,629,672 B1 * | 10/2003 | Goodzeit et al. | 244/171 |

OTHER PUBLICATIONS

Seing Peter Kad and John Abernathy, "A Ring Laser Gyro Based Staller Aided Inertial Navigation System", Space and Strategic Avionics Division, Honeywell Inc, Clearview, Florida. 1988 ATAA Missle Science Conference Monterey, CA.

* cited by examiner

Primary Examiner—Peter M. Poon
Assistant Examiner—Timothy D. Collins
(74) Attorney, Agent, or Firm—Ingrassia Fisher & Lorenz

(57) ABSTRACT

A sensor alignment system and method is provided that facilitates the precise alignment determination of satellite sensors. The system and method utilizes an Inertial Measurement Unit (IMU) to facilitate alignment determination of multiples sensors on a satellite. The system and method performs a roll of the satellite around a preliminary sensor active axis, using the IMU to measure the rotation rate in both magnitude and direction. The sensor input is monitored by the IMU during the roll around the preliminary sensor axis. The data from sensor output obtained during the roll can be processed to calculate the difference between the preliminary sensor axis and the actual sensor axis. From this calculation the actual alignment of the sensor axis can be determined. Furthermore, by performing this alignment determination operation for multiple sensors the relative alignment between sensors can be determined.

9 Claims, 2 Drawing Sheets

IN-ORBIT SATELLITE SENSOR ALIGNMENT DETERMINATION

FIELD OF THE INVENTION

This invention generally relates to sensor systems, and more specifically relates to satellite sensor systems.

BACKGROUND OF THE INVENTION

Satellites are being in increasingly diverse range of important applications. Today, satellites provide a host of communication, weather, military and scientific services. The increasing use of satellites makes their operational accuracy of increased concern.

For example, many satellites provide a mission sensor that provides important data about some physical quantity. For example, weather satellites may provide radar system that tracks changes in weather. A communication satellite may provide an antenna that receives and transmits remote communication transmissions. An intelligence satellite may provide images of a selected location on the earth's surface. In each of these cases, the mission sensor provides an important service for the operation of the satellite.

One important issue in the calibration of these satellites is the determination of mission sensor alignment. Typically, past methods of determining the alignment of the mission sensor have relied upon a complicated procedure on the ground. This ground alignment typically involves setting up the mission sensor and representing its operational axis with some type of optical reference surface. The sensors may not even be activated during this procedure. Unfortunately, this type of alignment procedure is time consuming and expensive. Additionally, this on-the-ground alignment suffers from inherent limitations. For example, the optical reference may not precisely represent the sensor active axis. As another example, the effects of Earth's gravity on the satellite may distort the alignment when compared to its eventual operational environment. Additionally, aligning the mission sensor to optical reference surfaces suffers from inherent inaccuracies.

Thus, what is needed is an improved system and method for determining the alignment of satellite sensors that provides for increased accuracy and reduced costs.

BRIEF SUMMARY OF THE INVENTION

The present invention provides a sensor alignment system and method that provides for precise alignment determination of satellite sensors. The system and method utilizes an Inertial Measurement Unit (IMU) to facilitate alignment determination of multiple sensors on a satellite. The system and method performs a roll of the satellite around a preliminary sensor active axis, using the IMU to measure the rotation rate in both magnitude and direction. The sensor input is monitored by the IMU during the roll around the preliminary sensor axis. The data from sensor output obtained during the roll can be processed to calculate the difference between the preliminary sensor axis and the actual sensor axis. From this calculation the actual alignment of the sensor axis with respect to the IMU can be determined. Furthermore, by performing this alignment determination operation for multiple sensors the relative alignment between sensors can be determined using the IMU as the common reference. For example, the relative alignment between a mission sensor and one or more utility sensors can be determined. Determining the relative alignment between the mission sensor and the utility sensor provides for accurate alignment determination between sensors. The system and method thus allows alignment determination to be performed in-orbit, reducing the impact of gravity on the alignment calibration process. Additionally, this process reduces the need for time consuming and expensive on-the-ground alignment determination.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a sensor alignment system and method that provides for precise alignment determination of satellite sensors. The system and method utilizes an Inertial Measurement Unit (IMU) to facilitate alignment determination of multiple sensors on a satellite. The system and method performs a roll of the satellite around a preliminary sensor active axis, using the IMU to measure the rotation rate in both magnitude and direction. The sensor input is monitored by the IMU during the roll around the preliminary sensor axis. The data from sensor output obtained during the roll can be processed to calculate the difference between the preliminary sensor axis and the actual sensor axis. From this calculation the actual alignment of the sensor axis with respect to the IMU can be determined. Furthermore, by performing this alignment determination operation for multiple sensors the relative alignment between sensors can be determined using the IMU as the common reference. For example, the relative alignment between a mission sensor and one or more utility sensors can be determined. Determining the relative alignment between the mission sensor and the utility sensor provides for accurate alignment determination between sensors. The system and method thus allows alignment determination to be performed in-orbit, reducing the impact of gravity on the alignment calibration process. Additionally, this process reduces the need for time consuming and expensive on-the-ground alignment determination.

The present invention can be used to provide alignment determination for a wide variety of sensor types. For example, it can be used to determine alignment for satellite sensors that provide visual imaging, radar imaging, signal detection such as x-ray sensors, and antennas such as transmission and reception antennas. It can thus be applied to many different satellites, including communication satellites, weather satellites, research satellites, reconnaissance satellites, military satellites and all other satellite systems with multiple onboard sensors.

All of these types of satellites commonly include one or more sensors to perform its operation, including one or more mission sensors and one or more utility sensors. In general, the mission sensor is defined as the sensors employed to perform the primary mission or missions of the satellite.

Thus, in a communication satellite the mission sensors could be the main communication antennas. In a weather satellite the mission sensor could be a radar or infrared imager. The utility sensors are generally those sensors used in the operation of the satellite itself. For example, star sensors, horizon sensors and other sensors are commonly used to orient and control satellite operation.

Figure 1:
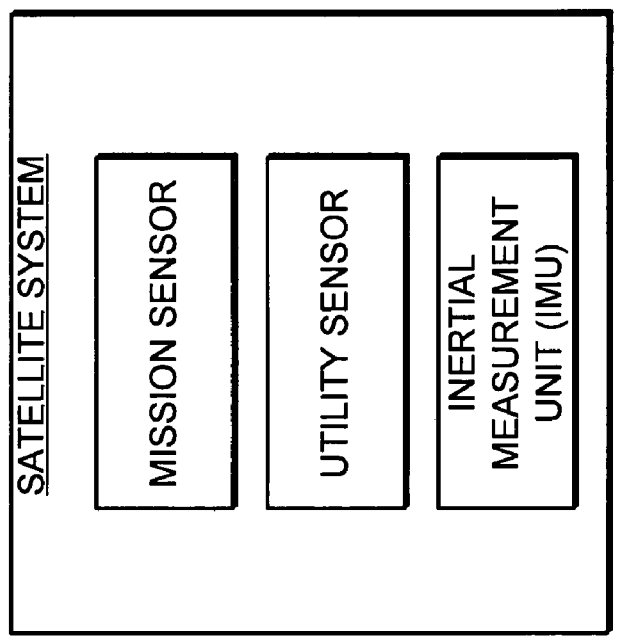
FIG. 1 is a schematic view of a satellite system.

Turning now to FIG. 1, a simplified schematic view of a satellite system is illustrated. The satellite system includes a mission sensor, a utility sensor and an inertial measurement unit (IMU). Those skilled in the art will recognize that typical satellites employed today will include additional systems not illustrated here. Examples of these additional systems are power systems, control systems, communications systems, etc.). The embodiments of the present invention provide an improved method for determining the alignment of the sensors in the satellite. Thus, the embodiments of the present invention can be used to determine the alignment of the mission sensor and the utility sensor, or any other sensors or combination of sensors on the satellite. These sensors can be any combination of sensors that are used on satellite systems, such as those utility and mission sensors discussed above.

The IMU in the satellite system of FIG. 1 provides the ability to track directional movement in the system. Specifically, the IMU provides the ability to measure rotational motion of the satellite. Typically, IMUs for this purpose include multiple gyroscopes and processing capability to accurately measure rotational motion. Examples of suitable IMUs that can be used to implement the invention are those based on the GG1320 RLG, such as the Miniature Inertial Measurement Unit (MIMU) available from Honeywell, Inc. This IMU is based on the GG1320 Ring Laser Gyros capable of accurate measurement of satellite rotational motion. Of course, other IMU devices capable of accurate measurement of satellite rotational motion can be used.

Figure 2:
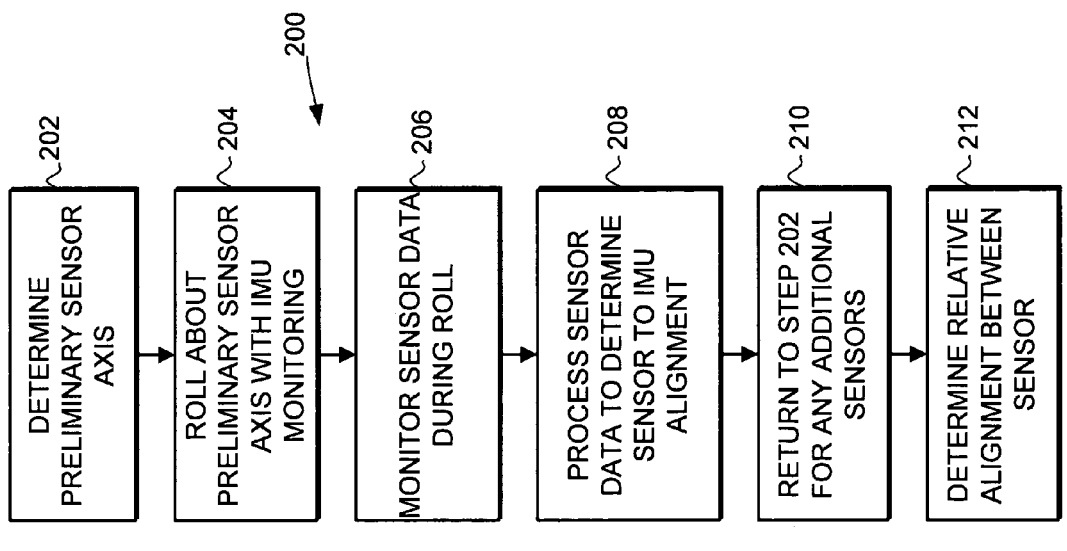
FIG. 2 is a flow diagram of a method for in-orbit alignment determination for multiple sensors.

Turning now to FIG. 2, a method 200 for determining an alignment of a satellite sensor is illustrated. The method 200 can be used to determine the alignment of any type of satellite sensor. The method 200 is particularly applicable to determining the relative alignment between multiple sensors, such as between a mission and a utility sensor.

The first step 202 is to determine a preliminary sensor axis. The preliminary sensor axis is essentially the first guess at determining the actual sensor axis, usually based on manufacturer's engineering specifications. The method of determining the preliminary sensor axis would typically depend upon the type of sensor. In some cases when the sensor is initially installed and set up on the satellite a preliminary value for the sensor axis is determined For example, the preliminary sensor axis for a imaging sensor can be determined by the sensor vendor in the form of an optical reference surface. The optical reference surface provides a convenient representation of the imager sensitive axis without requiring actual activation. On satellite, the manufacturer would provide a mounting surface with proper guiding pins for preliminary alignment of the imaging sensor in the appropriate alignment. Together, these features provide a preliminary sensor axis determination. As another example, the radiation beam pattern of a communication (or radar) antenna may be accurately mapped by the vendor. An optical surface is attached to the antenna to represent the beam center without actual activation of the system in the field. Likewise, the satellite manufacturer would provide a mounting interface for preliminary alignment of the antenna on the satellite. Again, this provides a preliminary sensor axis determination. In summary, step 202 can be accomplished by any suitable method or mechanism that determines a preliminary sensor axis for the sensor.

The next step 204 is to begin a satellite roll about the preliminary sensor axis. Thus, the satellite is commanded to roll about the preliminary sensor axis, with the preliminary sensor axis serving as the axis of rotation. This is performed in-orbit with the satellite sensor systems fully activated. The mechanisms used to facilitate this roll include the attitude control systems on the satellite. For example the satellite can be rotated using maneuvering thrusters or control moment gyroscopes. The rotation of the satellite about the preliminary axis is monitored and controlled by the IMU. As stated above, the IMU uses multiple gyroscopes to measure rotational motion of the satellite. As the satellite rotates about the preliminary axis, the IMU thus tracks and controls the rotational movement about the axis.

The next step 206 is to monitor the sensor data during the roll. The sensor data taking with the sensor, combined with the rotational data provided by the IMU, will be used to determine the actual sensor axis. Typically, at least two measurements from the sensor need to be taken at different points along the rotational path. However, additional sensor measurements can be taken and will generally improve the accuracy of the method. Also it should be noted that the measurements can generally be taken at any location along the rotational path. However, it generally improves the accuracy if the measurements are taken far apart, so it would be desirable to take the measurements as close to 180 degrees apart as possible.

For example, in the case of a star sensor, when the satellite is commanded to roll about the preliminary LOS (Line of Sight) to a star, the star image will trace a circle on the detector plane with the radius of the circle proportional to the magnitude of the alignment error in the preliminary LOS with respect to the IMU sensitive axes.

The next step 208 is to process the sensor data to determine the actual alignment of the sensor to the IMU. Specifically, the actual alignment of the sensor axis can be determined by comparing the expected sensor measurements to those taken as the satellite was rotated about the preliminary sensor axis.

By taking measurement data at different points along the roll, polarity of any misalignment between the preliminary sensor axis and the IMU can be determined. For example, a 180 degree roll will cause the polarity of the alignment to be completely reversed. Proper modeling and data processing enables the misalignment to be calculated from the repeated measurements. This can allow accurate measurements to be taken without the requirement for a full 180 degree roll. Hence, the actual alignment between the sensor axis and the IMU is established.

One way to accurately determine the actual sensor axis with reference to the IMU is with the implementation of a Kalman filter for data processing. The Kalman filter provides the ability for an accurate alignment determination with proper accounting of the various error sources that could corrupt the sensor and IMU measurements. One advantage to using IMUs based on the RLG is its ability to accurately track the angular motion because of its superb scale factor accuracy. Thus, a properly formulated Kalman filter can separate the actual satellite angular motion from the effect of the sensor axis misalignment from with the sensor travel between multiple measurements in the face of various corrupting errors.

The next step 210 is return to step 202 for any additional sensors for which their alignment is to be determined. Thus, steps 202–208 can be performed for each sensor on the satellite. The relative alignment of each sensor's axis and the IMU can thus be determined. The IMU thus serves as a common reference frame for determining the relative alignment of a plurality of sensors. Then when the relative alignment has been determined for each sensor, the method moves to step 212.

The next step 212 is to determine the relative alignment between sensors. Since the relative alignment of each sensor and the IMU has been determined, this data can be used to determine the relative alignment between the sensors themselves. Thus, the relative sensor axis for multiple sensors can be accurately determined. This allows, for example, the sensitive axis of a mission sensor to be determined relative to one or more mission sensors.

The present invention thus provides a sensor alignment system and method that provides for precise alignment determination of satellite sensors. The system and method utilizes an Inertial Measurement Unit (IMU) to facilitate alignment determination of multiples sensors on a satellite. The system and method performs a roll of the satellite around a preliminary sensor active axis, using the IMU to measure the rotation rate in both magnitude and direction. The sensor input is monitored by the IMU during the roll around the preliminary sensor axis. The output data from sensor obtained during the roll can be processed to calculate the difference between the preliminary sensor axis and the actual sensor axis. From this calculation the actual alignment of the sensor axis can be determined. Furthermore, by performing this alignment determination operation for multiple sensors the relative alignment between sensors can be determined.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A method of determining an alignment of a first and second satellite sensor, the method comprising the steps of:
   a) determining a preliminary first sensor axis for the first satellite sensor;
   b) performing a rotational roll around the preliminary sensor axis while monitoring rotational roll with an inertial measurement unit (IMU) and monitoring first sensor data from the satellite sensor;
   c) determining a preliminary second sensor axis for the second satellite sensor;
   d) performing a rotational roll around the preliminary second sensor axis while monitoring rotational roll with the IMU and monitoring second sensor data from the second satellite sensor; and
   evaluating the first and second sensor data to determine a relative alignment between the first satellite sensor and the second satellite sensor.

2. The method of claim 1 wherein the step of performing a rotational roll around the preliminary first sensor axis while monitoring rotational roll with an inertial measurement unit (IMU) and monitoring first sensor data from the first satellite sensor comprises taking at least two first sensor measurements at different locations during the rotational roll and wherein the step of performing a rotational roll around the preliminary second sensor axis while monitoring rotational roll with the IMU and monitoring second sensor data from the second satellite sensor comprises taking at least two sensor second measurements at different locations during the rotational roll.

3. The method of claim 1 wherein the step of evaluating the first and second sensor data to determine a relative alignment between the first satellite sensor and the second satellite sensor comprise processing the first sensor data to calculate misalignment between the first preliminary sensor axis and an actual firs sensor axis and processing the second sensor data to calculate misalignment between the second preliminary sensor axis and an actual second sensor axis.

4. The method of claim 1 wherein the step of evaluating the first and second sensor data further comprises evaluating the first and second sensor data with a Kalman filter.

5. The method of claim 1 wherein the first sensor comprises a mission sensor and the second sensor comprises a utility sensor.

6. An system for determining an alignment of a first satellite sensor and a second satellite sensor, the system comprising the steps of:
   f) an inertial measurement unit, the inertial measurement unit controlling and monitoring a rotational roll around a first preliminary sensor axis while monitoring sensor data from the first satellite sensor, the inertial measurement unit further controlling and monitoring a rotational roll around a second preliminary second axis while monitoring sensor data from the second satellite sensor; and
   g) an alignment determination mechanism evaluating the sensor data to determine a first actual sensor axis for the first satellite sensor and to determine a second actual sensor axis for the second satellite sensor, the alignment determination mechanism thus determining relative alignment between the first actual sensor axis and the second actual sensor axis.

7. The system of claim 6 wherein the system monitors sensor data from the first satellite sensor by taking at least two sensor measurements at different locations during the rotational roll.

8. The system of claim 6 wherein the alignment determination mechanism evaluates the sensor data to determine a first actual sensor axis for the satellite sensor by processing the sensor data to calculate misalignment between the preliminary sensor axis and the actual sensor axis.

9. The system of claim 8 wherein the alignment determination mechanism includes a Kalman filter to process the sensor data.

* * * * *

UNITED STATES PATENT AND TRADEMARK OFFICE
CERTIFICATE OF CORRECTION

PATENT NO. : 7,090,170 B1
APPLICATION NO. : 10/302388
DATED : August 15, 2006
INVENTOR(S) : Shing P. Kau It is certified that error appears in the above-identified patent and that said Letters Patent is hereby corrected as shown below:

Column 6, line 18, "firs" should be changed to --first--

Signed and Sealed this

Twenty-seventh Day of November, 2007

JON W. DUDAS
*Director of the United States Patent and Trademark Office*